UNITED STATES PATENT OFFICE.

PAUL P. REESE AND EMORY L. DIEHL, OF MUNHALL, PENNSYLVANIA.

METHOD OF TREATING ALLOY-STEEL SCRAP.

1,108,235. Specification of Letters Patent. Patented Aug. 25, 1914.

No Drawing. Application filed February 7, 1911. Serial No. 607,115.

*To all whom it may concern:*

Be it known that we, PAUL P. REESE and EMORY L. DIEHL, of Munhall, in the county of Allegheny and State of Pennsylvania, have invented new and useful Improvements in Methods of Treating Alloy-Steel Scrap, of which the following is a full, clear, and exact description.

Our invention relates to the utilization of alloy steel scrap containing chrome, nickel, vanadium, or other alloying elements either singly or otherwise, and the invention is designed to provide a novel method of treating such scrap whereby oxidation of the expensive metals used in making alloy steels is overcome and prevented, excessive waste due to the oxidation of the alloying elements is avoided, the use of such alloy steel scrap in making an alloy steel of substantially the same composition as that of the scrap charged into the furnace is made possible practically, and the cost of making such steel is greatly lessened. Heretofore such alloy steel scrap has been used in later steel making operations at the expense of losing, by oxidation, substantially all of the alloying elements in the scrap charged into the furnace in re-melting in the ordinary regenerative open hearth furnace. The extent of such losses will vary depending upon the composition of the steel as some of the alloying elements used oxidize much more readily than others.

In carrying out our invention a combination electric and regenerative open hearth furnace preferably having a basic lining is employed and preferably means are provided for practically excluding inflow of air into the interior of the furnace. The furnace may be of the arc, resistance, arc and resistance, or induction type, combined with the usual regenerators and flue connections forming part of a regenerative open hearth furnace equipment.

In the practice of treating alloy steel scrap in accordance with our improved method, a charge of the alloy steel scrap, either in a cold or pre-heated state, is placed within the furnace and the charge of scrap is heated to a point slightly below the melting point of the metal. In heating the metal to such temperature, the outer surface of the metal scrap will become oxidized to some extent, but as some of the oxidized alloying metal is recovered from the slag in the later steps of our method, the losses by oxidation are greatly reduced and are so small as to be practically negligible.

When the charged scrap has been heated to about the melting point of the metal, the flue connections to the air regenerators are shut off from the furnace, the carbons or electrodes forming part of the furnace equipment are then adjusted and further heat in the furnace is generated by electricity. When the flues connecting the furnace hearth with the air regenerators are closed, care is taken to have all openings into the furnace closed so as to practically seal the furnace and to prevent further admission of air. After the electrodes have been adjusted, the heated scrap is then further heated by electrical energy, until the charged metal is entirely melted and brought to the desired temperature.

Such alloy steel scrap oxidizes so readily that the alloying element or elements practically disappear when the scrap is heated and melted entirely by means of an oxidizing flame or in an oxidizing atmosphere as is met with in the ordinary open hearth furnace.

To overcome or prevent the oxidation of the alloying element or elements in the steel scrap, preferably, after the scrap is heated to about the melting point the further heating necessary to melt and raise the temperature of the molten steel to the temperature desired for pouring is carried out in a non-oxidizing or neutral atmosphere and a current of non-oxidizing gases, preferably producer gas, is caused to pass through the furnace while the steeel is being heated or re-melted by means of the electric current. In this way a non-oxidizing atmosphere is maintained within the furnace during the time the metal is being heated from about the melting point to the pouring temperature, and oxidation other than the slight amount caused by heating the cold metal up to about the melting point is avoided.

It is found difficult to form and maintain a reducing or neutral atmosphere in the furnace by passing non-oxidizing or reducing gases therethrough, and we form a slag, preferably early in the process, and from time to time, as found necessary, add, in a finely divided condition, other agents such as ferro-silicon, aluminum, magnesium, carbon, forming a reduced slag.

In some cases it will be desired to form a steel having a lower percentage of alloying elements than that contained in the charged scrap and in such cases steel or steel producing materials are added to the charge in the furnace, either cold or molten, in sufficient quantities to dilute the steel scrap to bring it to the desired composition. After the heat is melted and has become sufficiently hot to pour readily it is tapped and additions made as needed in the usual manner.

The advantages of our invention will be apparent to those skilled in the art. By the use of our improved process alloy steels can be made from alloy steel scrap. Excessive losses of the expensive alloying elements by oxidation are prevented and overcome and by the use of our improved method the accumulation of large quantities of such scrap is prevented and overcome.

Modifications in the temperatures employed in carrying out our improved method and changes in the construction and arrangement of the furnace may be made without departing from our invention as defined in the claims.

We claim:—

1. In the treatment of alloy steel scrap containing nickel, the steps consisting in heating the scrap by regenerative heat to about its melting point, then further heating and melting the heated scrap by means of an electric current, maintaining a non-oxidizing atmosphere for the scrap during the melting operation, and adding reducing agents to form a reduced slag and thereby restore oxidized alloying elements to the steel.

2. In the treatment of alloy steel scrap containing nickel and chromium, the steps consisting in heating the scrap by regenerative heat to about its melting point, then further heating and melting the heated scrap by means of an electric current, maintaining an atmosphere of non-oxidizing gases for the scrap during the melting operation to lessen oxidation of the alloying elements, and adding reducing agents to form a reduced slag and thereby restore oxidized alloying elements in the slag to the steel.

3. In the treatment of alloy steel scrap containing nickel, chromium, and vanadium, the steps consisting in heating the scrap by regenerative heat to about its melting point, then melting and heating the scrap to the tapping temperature by means of an electric current, maintaining an atmosphere of non-oxidizing gases for the scrap during the melting operation to lessen oxidation of alloying elements in the steel, and adding reducing agents to the melted scrap to form a reduced slag and thereby restore oxidized alloying elements to the steel.

4. In the treatment of alloy steel scrap containing nickel, chromium, vanadium and manganese, the steps consisting in heating the scrap by regenerative heat to about its melting point, then melting and further heating the heated scrap by means of an electric current, passing a stream of non-oxidizing gases over the scrap during the melting operation, and adding slag forming materials to the scrap during the melting operation to form a reduced slag and thereby reduce the oxidized alloying elements in the slag.

In testimony whereof, we have hereunto set our hands.

PAUL P. REESE.
EMORY L. DIEHL.

Witnesses:
D. L. ZACHARIAS,
C. L. WILSON.